United States Patent
Lindgren et al.

(10) Patent No.: US 12,545,527 B2
(45) Date of Patent: Feb. 10, 2026

(54) METHOD FOR ATTACHING INSULATING ELEMENTS TO STRUCTURAL ELEMENTS

(71) Applicant: SIKA TECHNOLOGY AG, Baar (CH)

(72) Inventors: Henrik Lindgren, Feluy (BE); Wolf-Peter Sander, Nidderau (DE)

(73) Assignee: SIKA TECHNOLOGY AG, Baar (CH)

( * ) Notice: Subject to any disclaimer, the term of this patent is extended or adjusted under 35 U.S.C. 154(b) by 294 days.

(21) Appl. No.: 18/271,748

(22) PCT Filed: Feb. 2, 2022

(86) PCT No.: PCT/EP2022/052497
§ 371 (c)(1),
(2) Date: Jul. 11, 2023

(87) PCT Pub. No.: WO2022/171505
PCT Pub. Date: Aug. 18, 2022

(65) Prior Publication Data
US 2024/0317510 A1    Sep. 26, 2024

(30) Foreign Application Priority Data
Feb. 11, 2021   (EP) .................... 21156672

(51) Int. Cl.
*B65G 47/90* (2006.01)
*B25J 9/06* (2006.01)
*B62D 65/02* (2006.01)

(52) U.S. Cl.
CPC ................ *B65G 47/90* (2013.01); *B25J 9/06* (2013.01); *B62D 65/022* (2013.01)

(58) Field of Classification Search
CPC ........... B65G 47/90; B65J 9/06; B62D 65/022
(Continued)

(56) References Cited

U.S. PATENT DOCUMENTS 5,266,133 A    11/1993   Hanley et al.
5,358,397 A *  10/1994   Ligon .................... B30B 11/24
                                                    264/177.17
(Continued)

FOREIGN PATENT DOCUMENTS

DE    10 2015 005 643 A1    11/2016
DE    10 2018 210 148 A1    12/2019
(Continued)

OTHER PUBLICATIONS

May 2, 2022 Search Report issued in International Patent Application No. PCT/EP2022/052497.
(Continued)

*Primary Examiner* — Hau V Phan
(74) *Attorney, Agent, or Firm* — Oliff PLC (57) ABSTRACT

A system for mounting insulating elements on structural elements in motor vehicles includes a plurality of provided insulating elements, a transfer element, an intermediate station, a robot, and at least one structural element. The transfer element is designed to arrange the provided insulating elements in the intermediate station, and the insulating elements are arranged in a predefined spatial location and position in the intermediate station for removal by the robot. The robot is designed to remove respective individual insulating elements from the intermediate station and to arrange them on structural elements.

15 Claims, 7 Drawing Sheets

(58) Field of Classification Search
USPC .......................................................... 280/770
See application file for complete search history.

(56) References Cited

U.S. PATENT DOCUMENTS

| | | | |
|---|---|---|---|
| 5,373,027 A | 12/1994 | Hanley et al. | |
| 5,997,670 A * | 12/1999 | Walter | B29C 63/02 |
| | | | 156/212 |
| 6,387,470 B1 | 5/2002 | Chang et al. | |
| 6,471,774 B1 * | 10/2002 | Krueger | B05C 5/022 |
| | | | 901/45 |
| 6,675,467 B2 * | 1/2004 | Oatridge | B62D 65/02 |
| | | | 29/771 |
| 6,699,346 B1 * | 3/2004 | Habisreitinger | B29C 63/02 |
| | | | 156/212 |
| 7,043,815 B2 * | 5/2006 | Lande | B29C 48/04 |
| | | | 425/149 |
| 7,467,452 B2 * | 12/2008 | Lande | B05D 1/265 |
| | | | 425/149 |
| 7,479,245 B2 * | 1/2009 | Barz | B29C 43/18 |
| | | | 264/297.6 |
| 9,616,574 B2 * | 4/2017 | Neumeier | B25J 11/00 |
| 10,696,033 B2 * | 6/2020 | DeFillipi | B32B 37/0046 |
| 2004/0195817 A1 * | 10/2004 | Tarbutton | B62D 27/026 |
| | | | 280/781 |
| 2014/0025197 A1 * | 1/2014 | Mattern | B25J 13/08 |
| | | | 700/218 |

FOREIGN PATENT DOCUMENTS

| | | |
|---|---|---|
| EP | 0 204 970 A2 | 12/1986 |
| EP | 3 756 983 A1 | 12/2020 |
| WO | 2005/080524 A1 | 9/2005 |

OTHER PUBLICATIONS

Aug. 15, 2023 International Preliminary Report on Patentability issued in International Patent Application No. PCT/EP2022/052497.

\* cited by examiner

METHOD FOR ATTACHING INSULATING ELEMENTS TO STRUCTURAL ELEMENTS

The invention relates to a system for mounting insulating elements on structural elements in a motor vehicle. The invention further relates to a method of mounting such insulating elements on structural elements.

In many cases, components such as, for example, vehicle bodies and/or frames of means of transport and locomotion, especially of water or land vehicles or of aircraft, have structures with cavities in order to enable lightweight constructions. However, these cavities cause a wide variety of problems. Depending on the type of the cavity, the latter has to be sealed in order to prevent the ingress of moisture and soiling, which can lead to corrosion of the components. It is often also desirable to substantially reinforce the cavities and hence the component, but to maintain the low weight. It is often also necessary to stabilize the cavities and hence the components, in order to reduce noise which would otherwise be transmitted along or through the cavity. Many of these cavities have an irregular shape or a narrow extent, which makes it more difficult to seal, reinforce and insulate them properly.

Especially in automotive construction, but also in aircraft construction and boatbuilding, sealing elements (baffles) are therefore used in order to seal and/or acoustically insulate cavities, or reinforcing elements (reinforcers) are used in order to reinforce cavities.

Figure 1:
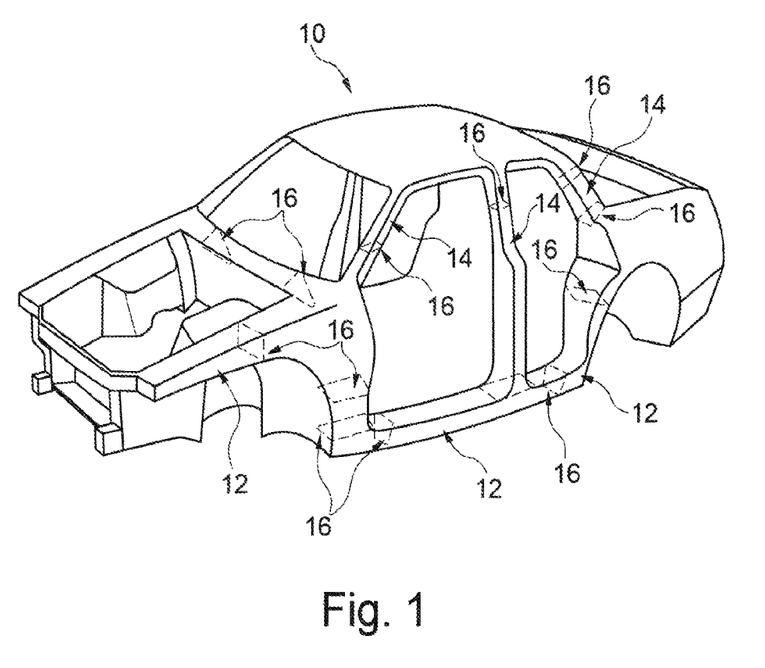
FIG. 1 an illustrative diagram of a vehicle body.

FIG. 1 shows a schematic of a body of an automobile. The vehicle body 10 here has various structures with cavities, for example pillars 14 and beams or crossbeams 12.

Such structural elements 12, 14 with cavities are typically sealed or reinforced with insulating elements 16.

Typically, such insulating elements 16 are mounted manually on the structural elements 12, 14. However, it is a disadvantage of this known manual method that it is laborious as a result, and that there is additionally a risk that insulating elements will be mounted at unintended positions, and also that incorrect insulating elements are mounted at a position on a structural element.

It is therefore an object of the present invention to provide an improved system for mounting insulating elements on structural elements in a motor vehicle that avoids the disadvantages of the prior art. The system is especially intended to have improved economic viability and to very substantially prevent the risk of incorrect installation.

This object is achieved firstly by a system for mounting insulating elements on structural elements of motor vehicles, said system comprising: a plurality of provided insulating elements, a transfer element, an intermediate station, a robot and at least one structural element; wherein the transfer element is designed to arrange the provided insulating elements in the intermediate station; wherein the insulating elements are arranged in a predefined spatial location and position in the intermediate station for removal by the robot; and wherein the robot is designed to remove respective individual insulating elements from the intermediate station and to arrange them on structural elements.

The system proposed here offers the advantage that the automated mounting of the insulating elements on structural elements crucially reduces the amount of labor involved. By virtue of the arranging of insulating elements in an intermediate station as proposed here, it is especially possible to load and prepare the system or the operation such that it can work autonomously for a prolonged period of time. Since it is generally the case that many insulating elements of this kind are installed per motor vehicle, this means a major saving of human labor.

Moreover, the automation of the mounting of insulating elements on structural elements has the advantage that this can reduce the risk of incorrect manipulations. It is sometimes the case, for example, that similarly shaped insulating elements are mounted at different sites in a vehicle body. In particular, there are also situations where a mirror-image insulating element is used on a left-hand and right-hand side of the vehicle body.

In such and similar situations, in the case of manual mounting of the insulating elements, there is the risk in each case that an incorrect insulating element will be used at a particular site, or that left-hand and right-hand insulating elements will be confused. The automation of this process can very substantially rule out such incorrect manipulations.

The system proposed here also offers the particular advantage that automation can be made much more efficient and inexpensive by virtue of the predefined arranging of the insulating elements in the intermediate station. By virtue of the arrangement of the insulating elements in the intermediate station which is predefined with regard to a spatial location and position, it is possible to simplify the operation of gripping of the insulating elements by the robot and make it more efficient.

In the context of this invention, the term "insulating element" comprises elements for closing off and/or sealing off and/or closing and/or reinforcing and/or insulating a structural element. These various characteristics of such an insulating element can arise individually or in combination with one another.

In the context of this invention, the terms "top side" and "bottom side" mean the two main surfaces or the two largest side surfaces of the insulating element. Since the insulating elements are designed to close a cross section in a structural element, this means that the top side and the bottom side are each substantially in a plane of a cross section to be sealed off in a state of use. In this respect, the top side and the bottom side may also have a stepped character, that is to say it is not necessary for the top side and the bottom side to have a completely flat form.

In the context of this invention, the term "parallel" in relation to the arrangement of insulating elements in a stack of a plurality of identical insulating elements means that the same surfaces and/or edges of the identical insulating elements are respectively arranged substantially parallel to one another.

In an illustrative embodiment, the insulating elements each comprise: a carrier; and an expandable material which is arranged on the carrier; wherein the insulating element has a top side and a bottom side which, in a state of use, are aligned substantially in a plane of a cross section of the structural element that is to be sealed off.

In an illustrative embodiment, the plurality of provided insulating elements are in a stacked arrangement one on top of another.

This firstly has the advantage that the insulating elements are thereby provided in stacked form. As a result, such insulating elements can be stacked one on top of another for transport and packed and transported in the stacked state. This firstly saves on transport costs because it allows the insulating elements to be packed in a more space-saving manner, with the result that in a given volume more insulating elements can be transported than was the case with conventional insulating elements. In addition, stacking such insulating elements offers the advantage that confusion between different insulating elements can be identified more easily. If, for example, a first insulating element is packed in a container with a plurality of second insulating elements, this is immediately noticeable because the first insulating element generally cannot be stacked with the second insulating elements. This makes it possible to greatly reduce confusion.

The provision of the insulating elements in stacked form also offers the advantage that the individual insulating elements cannot be damaged as easily because of the stacked arrangement for transport and storage. Specifically, if the individual insulating elements are transported loosely in a container as before, the insulating elements will repeatedly come into contact with one another, and damage can occur from time to time. However, if the insulating elements are transported in stacks, the number of times the insulating elements make mechanical contact with one another is greatly reduced. In addition, the insulating elements may be configured in such a way that the intended locations of contact have a robust form and/or one that is less prone to damage, and/or that locations of the insulating elements that are easier to damage are arranged at protected points which, for example, are covered by the adjacent insulating elements when stacked.

In an illustrative embodiment, the plurality of provided insulating elements are arranged in a container.

In an illustrative embodiment, the insulating element has at least one or at least two or at least three contact sites on each of the top side and the bottom side, where these contact sites are designed in such a way that, when a plurality of identical insulating elements are stacked, adjacent insulating elements respectively lie against one another via these contact sites and are thus arranged parallel to one another.

In an illustrative embodiment, the insulating element has exactly three contact sites on each of the top side and the bottom side, and these contact sites lie against one another when adjacent insulating elements are stacked.

In an alternative refinement, the insulating element has exactly four or at least four such contact sites on the top side and on the bottom side.

In a further alternative embodiment, the insulating element has exactly five or at least five such contact sites on the top side and on the bottom side.

In an illustrative embodiment, at least one contact site on the top side and an assigned contact site on the bottom side are formed in such a way that adjacent insulating elements are safeguarded against horizontal displacement in the case of stacking in vertical direction.

In an illustrative refinement, at least one contact site on the top side and an assigned contact site on the bottom side are formed in such a way that there is mechanical locking between the corresponding contact sites when stacking occurs.

In an illustrative embodiment, a contact site on the top side is in the form of a first coupling element and an assigned contact site on the bottom side is in the form of a second coupling element, wherein, in the case of stacking, the first coupling element and the second coupling element interlock in such a way that the adjacent insulating elements are temporarily fixed as a result.

In an illustrative embodiment, at least one contact site lies in a region of a fixing element.

In the context of this invention, a "region of a fixing element" is understood to mean the fixing element itself, a base of the fixing element, and the expandable material at the base of the fixing element that is required to seal off the opening in the structural element in which the fixing element is inserted.

In an illustrative embodiment, the fixing element is in the form of a clip.

In an alternative embodiment, the fixing element is in the form of a lug, weld lug, clamp, hook, or rivet.

In an illustrative embodiment, the fixing element is formed from plastic, especially polyamide, or from metal.

In an illustrative embodiment, a height of the fixing element in a stacking direction is less than 8 mm, preferably less than 7 mm, more preferably less than 6 mm.

In an illustrative embodiment, a height at the base of the fixing element in stacking direction that includes both a base of the fixing element and the expandable material at the base of the fixing element that is required to seal off the opening in the structural element in which the fixing element is inserted is at most 130% or at most 120% or at most 110% of a height of the fixing element in stacking direction.

The advantage of the configuration of such relative heights is that it allows the insulating elements to be packed in a more space-saving manner.

In an illustrative embodiment, at least one contact site is in the form of a spacer element, wherein the spacer element serves to support and/or position the insulating element on the structural element in a state of use of the insulating element in the structural element.

In an illustrative refinement, the spacer element is configured to be stackable per se, wherein two spacer elements stacked one inside the other have a total height in stacking direction of at most 170% or at most 160% or at most 150% or at most 140% or at most 130% of a height of an individual spacer element.

In an illustrative embodiment, steps of the carrier form an angle to the stacking direction of at least 350 or at least 400 or at least 45° or at least 50° or at least 55°.

The advantage of steps configured in this way is that insulating elements with flatter steps can be stacked more readily than would be the case with steeper steps. In the case of steeper steps, there is the problem in particular that adjacent insulating elements cannot be arranged vertically one above another without a horizontal offset.

In an illustrative embodiment, at least one contact site is in the form of a support element which protrudes from a general surface of the top side or the bottom side of the insulating element in stacking direction.

In an illustrative embodiment, all or individual contact sites are formed by the carrier.

In an alternative embodiment, all or individual contact sites are formed by the expandable material.

In a further embodiment, at least one contact site is formed by the carrier, and at least one contact site is formed by the expandable material.

Since the carrier can generally be produced with smaller tolerances than the expandable material, it may be advantageous for the contact sites to be formed as far as possible by the carrier.

In an illustrative embodiment, the insulating element has at least one securing element which is formed in such a way that, when the insulating elements are stacked one on top of another, an insulating element is secured by the securing element of an adjacent insulating element against displacement transverse to the stacking direction and/or against rotation of the insulating element about the stacking direction.

In an illustrative embodiment, the securing element is formed in such a way that, when the insulating elements are stacked one on top of another, the securing elements of two adjacent insulating elements overlap in stacking direction.

In an illustrative refinement, the securing elements overlap in stacking direction by at least 3 mm or by at least 5 mm or by at least 7 mm.

In an illustrative embodiment, the securing element has at least one guide surface which is formed such that, in the case of stacking, the guide surface guides an insulating element to be stacked, with the result that the newly stacked insulating element is arranged on the insulating element substantially congruently in stacking direction.

In an illustrative embodiment, at least one spacer element is configured as a securing element.

In an illustrative refinement, the spacer element has a substantially Y-shaped configuration. For example, individual surfaces of the legs of the Y-shaped spacer element here may be in the form of a guide surface.

In an alternative refinement, the spacer element is substantially U-shaped or V-shaped. Again, individual surfaces of the legs of the U-shaped or V-shaped spacer element here may be in the form of a guide surface.

In an illustrative embodiment, at least one step is configured as a securing element.

In an illustrative embodiment, at least one region of a fixing element is configured as a securing element.

In an illustrative refinement, a base of the fixing element is configured as a securing element. This base may, for example, have a substantially U-shaped form. In turn, in this case individual surfaces of the legs of the U-shaped base of the fixing element may be in the form of guide surfaces.

In an illustrative embodiment, all or individual securing elements are formed by the carrier.

In an alternative embodiment, all or individual securing elements are formed by the expandable material.

In a further embodiment, at least one securing element is formed by the carrier, and at least one securing element is formed by the expandable material.

Since the carrier can generally be produced with smaller tolerances than the expandable material, it may be advantageous for the carrier to form the securing elements as far as possible.

The expandable material used may in principle be various materials that can be made to foam. This material may or may not have reinforcing properties. Typically, the expandable material is made to expand thermally, by moisture or by electromagnetic radiation.

Such an expandable material typically has a chemical or a physical blowing agent. Chemical blowing agents are organic or inorganic compounds which decompose under the influence of temperature, moisture or electromagnetic radiation, wherein at least one of the decomposition products is a gas. Physical blowing agents used may, for example, be compounds that are converted to the gaseous state of matter with increasing temperature. As a result, both chemical and physical blowing agents are capable of creating foam structures in polymers.

The expandable material is preferably foamed thermally, with chemical blowing agents being used. Examples of suitable chemical blowing agents are azodicarbonamides, sulfohydrazides, hydrogencarbonates or carbonates.

Suitable blowing agents are, for example, also commercially available under the trade name Expancel® from Akzo Nobel, the Netherlands, or under the trade name Celogen® from Chemtura Corp., USA.

The heat required for the foaming can be introduced by external or by internal heat sources, such as an exothermic chemical reaction. The foamable material is preferably foamable at a temperature of <250° C., especially of 100° C. to 250° C., preferably of 120° C. to 240° C., preferably of 130° C. to 230° C.

Suitable expandable materials are, for example, one-component epoxy resin systems which do not flow at room temperature and in particular have elevated impact resistance and contain thixotropic agents such as aerosils or nanoclays. For example, epoxy resin systems of this type include 20% to 50% by weight of a liquid epoxy resin, 0% to 30% by weight of a solid epoxy resin, 5% to 30% by weight of impact modifiers, 1% to 5% by weight of physical or chemical blowing agents, 10% to 40% by weight of fillers, 1% to 10% by weight of thixotropic agents and 2% to 10% by weight of heat-activatable curing agents. Suitable impact modifiers are reactive liquid rubbers based on nitrile rubber or derivatives of polyether polyol polyurethanes, core-shell polymers and similar systems known to a person skilled in the art.

Likewise suitable expandable materials are one-component polyurethane compositions containing blowing agents and based on crystalline polyesters which have OH groups and have been mixed with further polyols, preferably polyether polyols, and polyisocyanates with blocked isocyanate groups. The melting point of the crystalline polyester should be >50° C. The isocyanate groups of the polyisocyanate may be blocked, for example, by nucleophiles such as caprolactam, phenols or benzoxalones. Also suitable are blocked polyisocyanates as used, for example, in powder-coating technology, and commercially available, for example, under the Vestagon® BF 1350 and Vestagon® BF 1540 trade names from Degussa GmbH, Germany. Suitable isocyanates are also what are called encapsulated or surface-deactivated polyisocyanates, which are known to a person skilled in the art and are described, for example, in EP 0 204 970.

Also suitable as expandable materials are two-component epoxy/polyurethane compositions which contain blowing agents, as described, for example, in WO 2005/080524 A1.

Also suitable as expandable materials are ethylene-vinyl acetate compositions containing blowing agents.

Expandable materials that are also suitable are sold by Sika Corp., USA, for example under the SikaBaffle® 240, SikaBaffle® 250 or SikaBaffle® 255 trade name, and are described in U.S. Pat. Nos. 5,266,133 and 5,373,027. Such expandable materials are particularly preferred for the present invention.

Preferred expandable materials having reinforcing properties are, for example, those which are sold under the SikaReinforcer® 941 trade name by Sika Corp., USA. These are described in U.S. Pat. No. 6,387,470.

In an illustrative embodiment, the expandable material has an expansion rate of 800% to 5000%, preferably of 1000% to 4000%, more preferably of 1500% to 3000%. Expandable materials having such expansion rates offer the advantage that, as a result, reliable sealing or sealing-off of the structural element with respect to liquids and sound can be achieved.

In an illustrative embodiment, the expandable material is in the form of a temperature-stimulated material.

This has the advantage that, as a result, the furnace for baking the dipcoating liquid can be used to expand the expandable material and hence to seal off the cavity. Consequently, no additional working step is required.

The carrier may consist of any desired materials. Preferred materials are plastics, especially polyurethanes, polyamides, polyesters and polyolefins, preferably polymers which can withstand high temperatures such as poly(phenylene ethers), polysulfones or polyether sulfones, which in particular are also foamed; metals, especially aluminum and steel; or grown organic materials, especially wood materials or other (densified) fibrous materials, or vitreous or ceramic materials; especially also foamed materials of this type; or any desired combinations of these materials. Particular preference is given to using polyamide, especially nylon-6, nylon-6,6, nylon-11, nylon-12 or a mixture thereof.

Furthermore, the carrier may be solid, hollow or foamed or have a meshlike structure, for example. Typically, the surface of the carrier can be smooth, rough or structured.

In the case of insulating elements in which the expandable material is located on a carrier, the production process differs according to whether the carrier consists or does not consist of a material that can be processed by injection molding. If this is the case, a two-component injection molding process is typically used. This involves first injecting a first component, in this case the carrier. After said first component has solidified, the cavity in the mold is enlarged, or adapted, or the molding produced is placed into a new mold, and a second component, in this case the expandable material, is overmolded onto the first component by a second injection apparatus.

If the carrier consists of a material that cannot be produced by the injection molding process, i.e., for example, consists of a metal, the carrier is placed into a corresponding mold and the expandable material is overmolded onto the carrier. Of course, it is also possible to fasten the expandable material to the carrier by specific fastening means or processes.

Furthermore, carriers can also be produced by other processes, for example by extrusion.

In an illustrative embodiment, the transfer element takes the form of a robot or of a cobot.

In an alternative embodiment, the transfer element is a human operator.

In an illustrative embodiment, the intermediate station comprises at least one base element, wherein the base element comprises positioning elements for positioning of the insulating element on the base element such that it is possible to arrange an insulating element or a stack on the base element in a predefined manner.

In an alternative embodiment, the intermediate station comprises at least one conveyor system which is designed to convey the insulating elements or the stacks successively into a predefined removal position.

In an illustrative refinement, the conveyor system is configured as a Paternoster system.

In a further alternative embodiment, the intermediate station comprises at least one frame which can accommodate a plurality of insulating elements, and which can provide the insulating elements in a predefined removal position.

In an illustrative refinement, the frame has at least one guide element that at least partly follows an outline of an insulating element.

In an illustrative refinement, the at least one guide element or the plurality of guide elements are designed such that the insulating elements can be taken up in only one spatial location.

In an illustrative embodiment, the intermediate station comprises a dedicated frame for each different type of insulating element provided by the system for processing. In particular, each frame has guide elements configured such that only the intended type of insulating element can be disposed therein.

The providing of separate and type-specific frames has the advantage that this can prevent incorrect manipulations.

The insulating element has a stack height which corresponds to an additional height in stacking direction of a stack having insulating elements by which the stack grows when a further insulating element is stacked onto the stack.

In an illustrative embodiment, a stack height of the insulating element is at most 80%, preferably at most 70%, preferably at most 60%, preferably at most 50%, preferably at most 40%, preferably at most 30%, of a total height of an individual insulating element in stacking direction.

This has the advantage that it allows the insulating elements to be arranged in a stack in a more space-saving manner. A greater degree of vertical nesting of adjacent insulating elements in a stack additionally improves the stability of an overall stack.

In an illustrative embodiment, a stack comprises at least ten or at least fifteen or at least twenty or at least twenty-five or at least thirty stacked insulating elements.

In a further illustrative embodiment, a stack comprises at most 150 or at most 120 or at most 100 or at most 80 or at most 60 stacked insulating elements.

In an illustrative embodiment, a lowermost insulating element of the stack lies on a base element.

The providing of such a base element firstly has the advantage that it allows a stack of insulating elements to be placed on a surface, especially without the stack falling over.

In an illustrative refinement, the base element is designed such that the stack is arranged thereon in such a way that the stacking direction is essentially vertical.

In an illustrative refinement, the base element comprises at least one positioning element for positioning of the lowermost insulating element of the stack on the base element.

The providing of at least one such positioning element has the advantage that this can firstly improve support or alignment of the stack, and that this can secondly also predefine positioning of the stack on the base element.

For automated processes, it is often important that spatial positions of elements that are manipulated by robots are exactly defined. A suitable selection of such positioning elements on the main elements can achieve such predefined positioning of the stacks.

In an illustrative refinement, the main element comprises multiple positioning elements.

In an illustrative refinement, a first positioning element is designed to accommodate a stack of a first type of insulating element, and at least one further positioning element on the same base element is designed to accommodate a stack of the same type of insulating element.

In an alternative refinement, the base element in turn comprises multiple positioning elements, where a first positioning element is designed to accommodate a stack of a first type of insulating element, and where at least one further positioning element on the same base element is designed to accommodate a stack of a different type of insulating element.

This accordingly allows multiple stacks either of the same type of insulating element or different types of insulating element to be arranged in a predefined manner on the same base element.

In an illustrative embodiment, the main element has a relief-like design, where a correspondingly shaped depression is formed for each stack on a surface of the base element.

However, such base elements may also be formed differently; for example, a flat base plate may be provided, on which various support elements such as columns or the like are provided, which position, align and support the stacks at a predefined position.

In an illustrative embodiment, the base element is formed from cardboard.

In an alternative illustrative embodiment, the base element takes the form of a plastic blister.

In an alternative embodiment, the base element is formed from plastic, especially as an injection molding or as a printed element.

In addition, various different possible designs for the base element are conceivable.

In an illustrative embodiment, the provided insulating elements are arranged in a container. In an illustrative refinement, the insulating elements are arranged in stacked form in the container.

The use of such a container has the advantage that, for example, the insulating elements can be provided specifically in a container which has also been used for the transport of the insulating elements. In this way, it is possible to avoid movement or rearrangement of the insulating elements.

In an illustrative embodiment, the container takes the form of a box, or of a crate, or of a pallet.

In an illustrative embodiment, at least one base element is disposed in the container.

In an alternative embodiment, only one base element is disposed in the container.

The use of at least one base element together with a container offers the advantage that it is possible in this way to align and position the stacks directly for transport, which is often space-saving and material-conserving in respect of the insulating elements.

In an illustrative embodiment, the base element covers essentially a floor of the container.

In a further alternative embodiment, a plurality of base elements are disposed in the container.

In an illustrative refinement, the plurality of base elements essentially cover the floor of the container.

In an alternative refinement, the plurality of base elements are arranged at least partly one on top of another.

In an illustrative refinement, the plurality of base elements form intermediate floors, such that the insulating elements or the stacks are arranged within the container in a plurality of layers separated from one another by the base elements.

In an illustrative embodiment, stacks are arranged in the container such that a stacking direction runs vertically when the container is in its intended position.

In an alternative embodiment, stacks are aligned such that a stacking direction runs essentially horizontally when the container lies in its intended position.

In an illustrative embodiment, a plurality of stacks are arranged in a container. In an illustrative refinement, the stacking directions of the multiple stacks in the container are aligned essentially parallel to one another.

In an illustrative embodiment, a plurality of stacks of the same type of insulating element are arranged in a container.

In an illustrative embodiment, a plurality of stacks of the same type of insulating element are arranged on a base element.

In an alternative embodiment, a plurality of stacks of different types of insulating element are arranged in a container.

In an alternative embodiment, a plurality of stacks of different types of insulating element are arranged on a base element.

In an illustrative embodiment, the container also comprises an antislip interlayer.

Such an antislip interlayer may be used, for example, to separate a plurality of layers of stacks in a container from one another without the risk of the layers slipping relative to one another.

In an illustrative embodiment, the robot comprises a multijoint robot arm and a gripper disposed thereon.

In an illustrative refinement, the robot comprises multiple grippers. This robot is designed such that it can use one gripper in each case to take a single insulating element from the intermediate station and arrange it on structural elements.

This gripper may be designed in various ways.

For example, the gripper may comprise a suction gripper and/or a parallel gripper and/or an expansion gripper.

In an illustrative embodiment, the gripper is designed to grip a plurality of different types of insulating elements.

In an illustrative embodiment, the gripper has at least two engaging elements which are designed to be able to fit into corresponding engaging elements on the insulating elements.

These engaging elements on the insulating elements and on the gripper of the robot may be configured in different ways.

For example, the engaging elements on the insulating element may take the form of hoods or depressions, and the corresponding engaging elements on the gripper may have a complementary design.

Or else the engaging elements on the gripper may take the form of holes or elongated holes of different size, for example, and the engaging elements on the insulating element may have a conical design, for example.

The engaging elements on the insulating elements may additionally take the form, for example, of steps, edges or fins.

In an illustrative refinement, these at least two engaging elements of the gripper are of different design.

A different design of the engaging elements has the advantage that it is possible thereby to unambiguously fix an alignment of the insulating elements on the gripper, such that the insulating elements cannot be gripped when rotated by 180°. It is thus possible to avoid incorrect manipulations by the robot.

In an illustrative embodiment, the structural element takes the form of a single metal sheet, or of a plurality of metal sheets bonded to one another, especially columns or beams or crossbeams, or of a constituent of a vehicle body, or of a vehicle body.

In an illustrative embodiment, the structural element has at least one opening, and the insulating element has at least one fixing element, where these two elements are designed such that the fixing element can be locked into the opening.

In the case of stacked insulating elements, in an illustrative embodiment, each additional insulating element increases the height of the stack by at most 20 mm, especially preferably by at most 18 mm, especially preferably by at most 16 mm, especially preferably by at most 14 mm, especially preferably by at most 12 mm, especially preferably by at most 10 mm.

The close stacking of insulating elements has the advantage that this allows the insulating elements to be packed and transported more efficiently.

The object stated at the outset is additionally achieved by a method for mounting insulating elements on structural elements of motor vehicles, said method comprising the steps of: providing multiple insulating elements; transferring the insulating elements to an intermediate station; making the insulating elements available in a predefined spatial location and position in the intermediate station for removal by a robot; removing individual insulating elements from the intermediate station by means of the robot; and mounting the insulating elements by means of the robot on a structural element.

In an illustrative embodiment, the method is conducted with an above-described system.

In an illustrative embodiment, the provided insulating elements are in the form of stacks comprising a plurality of insulating elements stacked one on top of another, and wherein the transferring involves transporting these stacks.

In an advantageous embodiment, the robot has a plurality of grippers, such that a plurality of insulating elements can be taken individually from the intermediate station.

In an alternative embodiment, the robot has only one gripper, and only one insulating element individually is taken from the intermediate station in each case.

In an illustrative embodiment, the method comprises the following further step: transporting the insulating elements in a container and/or on a base element; wherein the insulating elements are provided in the same container and/or on the same base element for removal by the robot.

The use of a container and/or base element for both transport and provision of the insulating elements for removal by the robot offers the advantage that this can greatly simplify the overall logistics and make them more efficient.

In an illustrative embodiment, the insulating elements, in the mounting operation, are grasped by the robot in a gripping direction and mounted on the structural element in an application direction, wherein the gripping direction and the application direction form essentially an angle of 90° or of 180°.

In an alternative embodiment, the gripping direction and the application direction form an angle within a range from 90° to 180°.

The use of such an alignment in the mounting of the insulating elements on the structural element has the advantage that it is possible thereby to choose a smaller gripping force in gripping direction because forces in the mounting of the insulating element on the structural element do not act against the gripping force.

In an illustrative embodiment, a force which is expended by the robot in gripping direction in order to grip the insulating element is smaller than a force which is expended by the robot in application direction in order to mount the insulating element on the structural element.

In an illustrative refinement, the force in application direction is at least twice or at least three times or at least four times the force in gripping direction.

In an illustrative embodiment, the gripper and the insulating element are mechanically interlocked in application direction.

This has the advantage that this allows a smaller gripping force to be selected because the insulating element is safeguarded against movement in application direction.

In an illustrative embodiment, in the mounting operation, a fixing element of the insulating element is locked into an opening of the structural element.

In an illustrative embodiment, in the gripping of an insulating element by the robot, at least two engaging elements of the insulating element are fitted into at least two corresponding engaging elements of a gripper, wherein the at least two engaging elements of the insulating element are of different design.

The providing of different engaging elements has the advantage that this can prevent incorrect manipulations, especially rotations by 180°.

These engaging elements on the insulating elements and on the gripper of the robot may be configured in different ways.

For example, the engaging elements on the insulating element may take the form of hoods or depressions, and the corresponding engaging elements on the gripper may have a complementary design.

Or else the insulating elements on the gripper may take the form of holes or elongated holes of different size, for example, and the engaging elements on the insulating element may have a conical design, for example.

The engaging elements on the insulating elements may additionally take the form, for example, of steps, edges or fins.

In an illustrative embodiment, an above-described system is designed such that an above-described method can be executed therewith.

Details and advantages of the invention will be described hereinafter using working examples and with reference to schematic drawings. The figures show:

FIGS. 3*a* to 6 a schematic diagram of a container with insulating elements disposed therein;

FIGS. 9*a* to 10*d* a schematic diagram of an illustrative robot and a corresponding gripper;

Figure 2A:
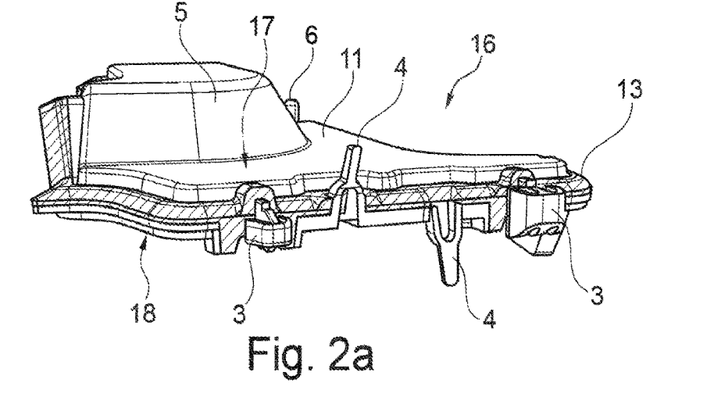
FIGS. 2*a* to 2*c* a schematic diagram of an illustrative insulating element or of a stack with a plurality of such insulating elements.

Firstly, FIG. 2*a* illustrates an individual insulating element 16. This insulating element 16 has a carrier 11 and an expandable material 13 arranged on this carrier 11. The insulating element 16 has a substantially flat form in order to be able to efficiently seal off a cross section of a structural element in a state of use. In this case, however, the insulating element 16 does not have a completely flat form, but rather has various elevations and step-shaped shoulders, in particular one steep step 5.

The insulating element 16 has a top side 17 and a bottom side 18 here. Moreover, the insulating element 16 in this working example has two fixing elements 3, which are each in the form of a clip, and two spacer elements 4, which are each aligned on different sides.

Moreover, the insulating element 16 has a support element 6 which, in this working example, is disposed on the top side 17 of the insulating element 16.

In this working example, the insulating element 16 has three contact sites disposed on the top side 17, and three respectively assigned contact sites on the bottom side 18. Two respective contact sites are disposed here in the regions of the fixing elements 3, and a further contact site takes the form of a support element 6 or a support point on the bottom side 18 of the insulating element 16.

Figure 2B:
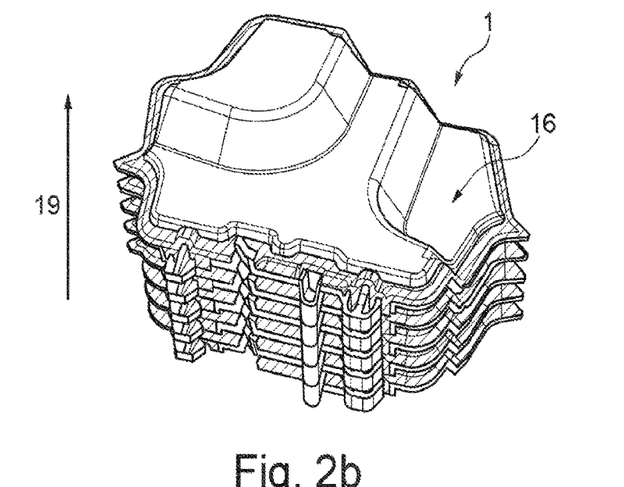

FIG. 2*b* illustrates a stack 1 having a plurality of insulating elements 16 according to FIG. 2*a*. The insulating elements 16 are stacked here one on top of another in a stacking direction 19. The stacked insulating elements 16 are arranged here parallel to one another and each lie one on top of another at the contact sites on their top side and bottom side.

Figure 2C:
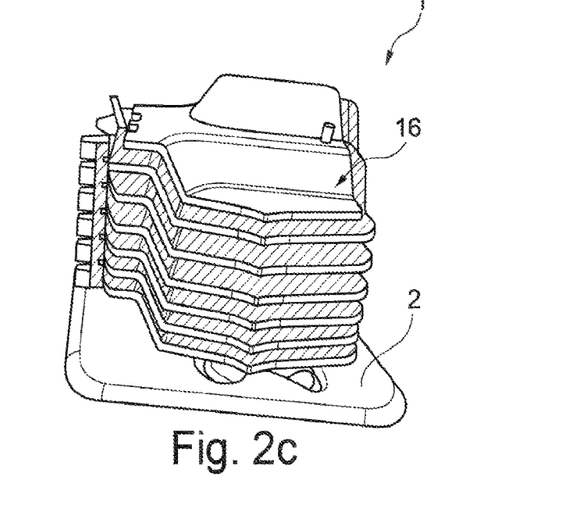

FIG. 2c in turn illustrates a stack 1 having stacked insulating elements 16, with the lowermost insulating element 16 of the stack 1 disposed on a base element 2 in this working example.

FIGS. 3a to 6 show various illustrative containers 7 with insulating elements 16 or stacks 1 disposed therein.

Figure 3A:
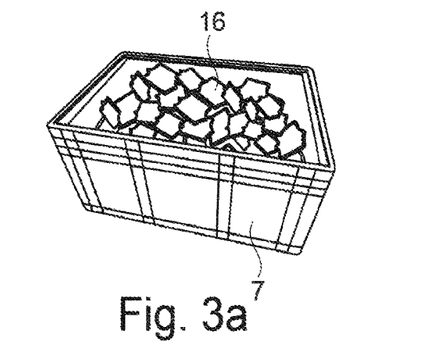
Figure 3B:
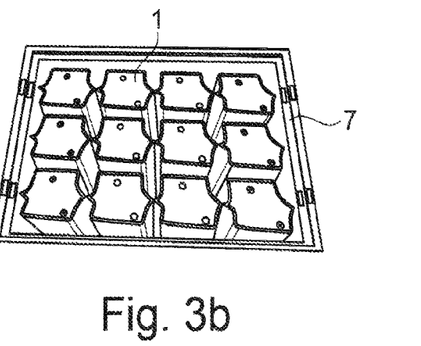

FIG. 3a shows a container 7 with insulating elements 16 in a loose arrangement therein, while FIG. 3b shows the same container 7 with stacked insulating elements 16, wherein the individual stacks 1 are arranged in the container such that a stacking direction is aligned essentially vertically when the container 7 is in its intended position.

Figure 4A:
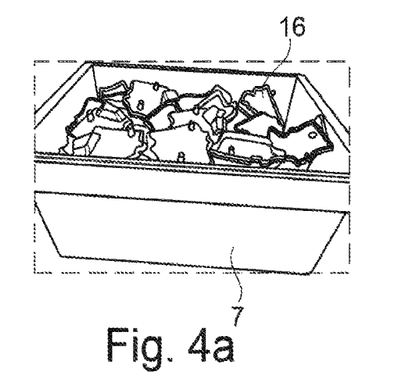
Figure 4B:
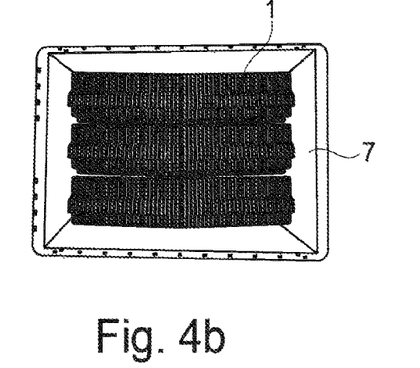

FIGS. 4a and 4b in turn show a schematic of a container 7, with the insulating elements 16 in FIG. 4a in unordered and loose form, and the insulating elements in FIG. 4b in a stacked arrangement in multiple stacks 1. In this working example, a stacking direction is chosen such that it runs essentially horizontally when the container 7 lies in its intended position.

Figure 5:
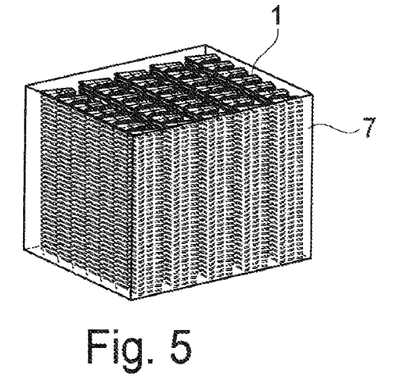

FIG. 5 shows a schematic of a further container comprising multiple stacks 1 comprising insulating elements. Such a container 7 is capable, for example, both of transporting and of providing the stacks 1 of the insulating elements for the removal of the individual insulating elements by a robot.

Figure 6:
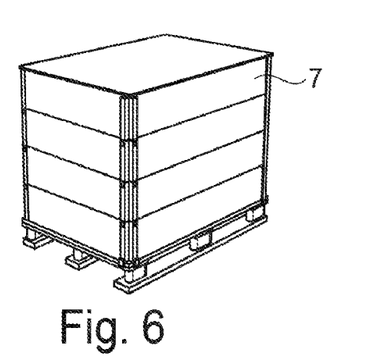

FIG. 6 shows a schematic of a further illustrative container 7. In this working example, the container 7 takes the form of a pallet. Such pallets are of especially good suitability for transport of the container 7.

Figure 7:
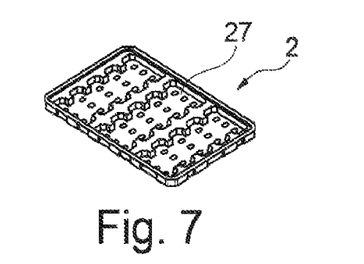
FIG. 7 a schematic diagram of an illustrative base element.

FIG. 7 shows a schematic of an illustrative base element 2. In this working example, the base element 2 has multiple positioning elements 27. In this working example, the positioning elements 27 take the form of depressions in a relief-like base element 2, with provision of one depression in each case to accommodate a stack 1 of insulating elements. The use of such base elements 2 allows predefinition of a position of the stacks 1, such that the robot needs to have less special sensor technology, if any, to grip the individual insulating elements.

Such base elements 2 may especially be arranged on the floors of containers 7.

Figure 8A:
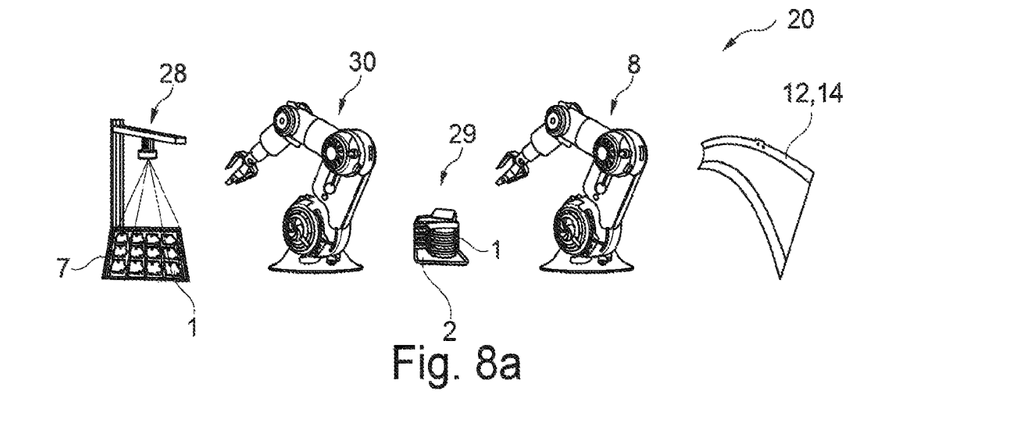
FIGS. 8*a* to 8*c* a schematic diagram of an illustrative system.
Figure 8B:
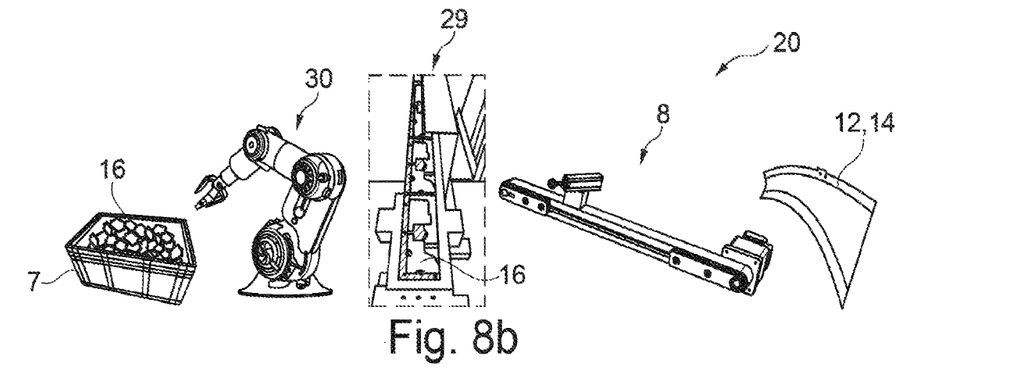
Figure 8C:
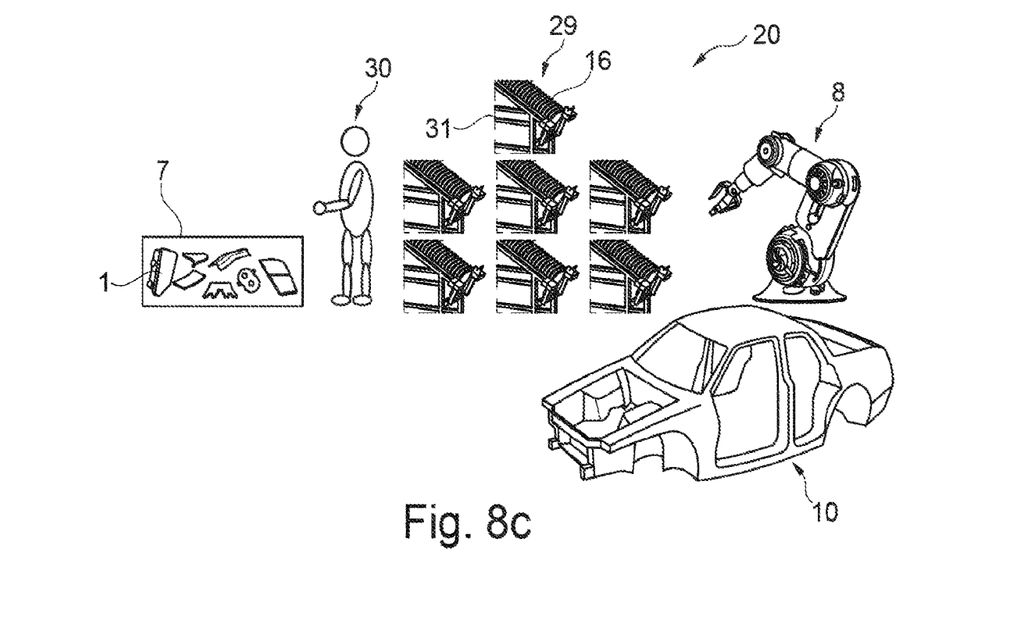

FIGS. 8a to 8c each show schematics of various working examples of systems 20 for mounting of insulating elements 16 on structural elements 12, 14.

In FIG. 8a, the stacks 1 are provided with insulating elements in a container 7. The transfer element 30 in this working example takes the form of a robot. It transfers the insulating elements in stacks 1 from the container 7 into the intermediate station 29. The transfer element 30, as well as a robot arm and a gripper, additionally has a position recognition device 28 that can process information about the position of the individual insulating elements and of the stacks 7. The insulating elements 16 are then taken from the intermediate station 29 by a robot 8 and are arranged on the structural element 12, 14. The robot 8 employed in this working example is a multiaxis robot with a gripping head.

In the working example according to FIG. 8b, multiple insulating elements 16 are again provided, but this time loosely in a container 7. Again, the transfer element 30 takes the form of a robot. The insulating elements 16 are arranged by the transfer element 30 in the intermediate station 29. In this example, the intermediate station 29 takes the form of a conveyor system that conveys the respective insulating elements 16 into a successively into a predefined removal position. The robot 8 employed in this working example is a conveyor belt with a gripper device disposed on the belt. This robot 8 takes the insulating elements 16 from this removal position in the intermediate station 29 and then mounts the individual insulating elements on a structural element 12, 14 which, in this working example, takes the form of a single metal sheet.

FIG. 8c shows a schematic of a further illustrative system 20. In this working example, a container 7 is again provided for provision of the insulating elements 16, here in the form of a stack 1. By contrast with the working example according to FIG. 8a, in this working example, stacks 1 comprising different types of insulating elements are disposed in a container 7. In this way, such a system can be used to arrange a multitude of different insulating elements from a single container 7 on the vehicle body 10.

The transfer element 30 in this example is a human operator. This human operator arranges the stacks 1 of the insulating elements 16 in the intermediate station 29, in this example in multiple frames 31. It is possible here, for example, to provide a separate frame 31 for each type of insulating element. The robot 8 takes the insulating elements 16 from these frames 31 in the intermediate station 29 and then mounts the individual insulating elements on a structural element 12, 14 which, in this working example, takes the form of a vehicle body. The structural elements of the vehicle body on which the insulating elements 16 are disposed are accessible, meaning that, for example, columns and beams of the vehicle body are not yet complete.

Figure 9A:
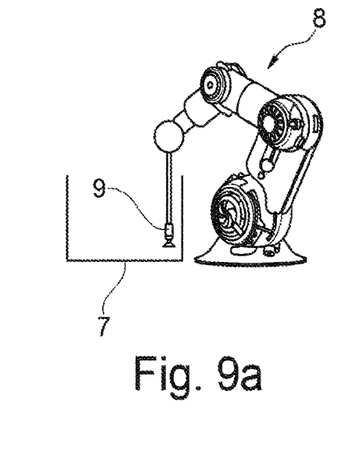
Figure 9B:
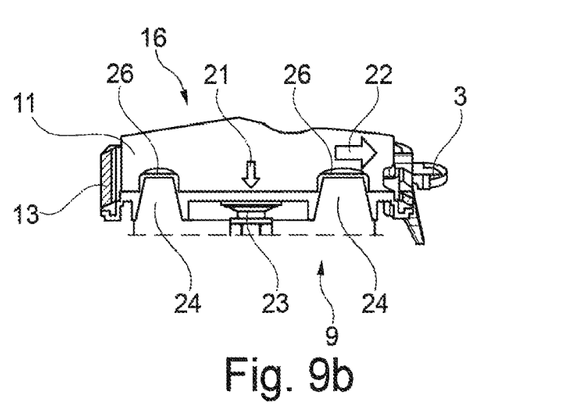

FIGS. 9a and 9b show a schematic of a robot 8 with an illustrative gripper 9. In this working example, the gripper 9 comprises a suction gripper 23 that can move an insulating element 16 by suction in a gripping direction. For better fixing of the insulating element 16 in the gripper 9, various engaging elements 24, 26 are additionally provided, which intermesh and mechanically lock the insulating element 16 and the gripper 9 to prevent lateral movement. In this working example, a fixing element 3 of the insulating element is aligned such that an application direction 22 forms essentially a 900 angle to the gripping direction 21.

Figure 10A:
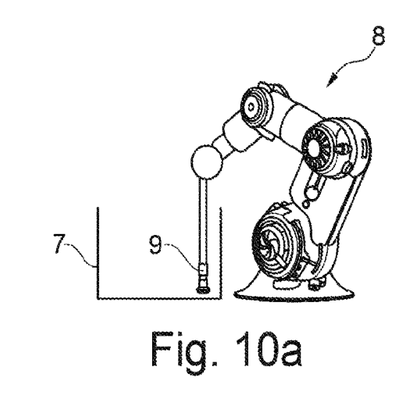
Figures 10B, 10C:
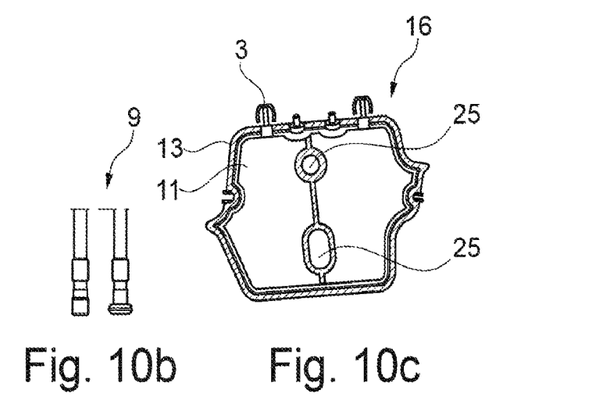
Figure 10D:
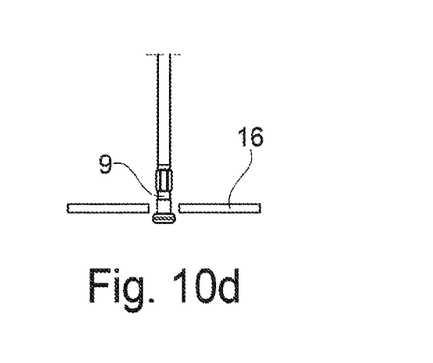

FIG. 10A shows a schematic of a further working example of a robot 8 with a gripper 9. In this working example, the gripper 9 is shown as an expansion gripper. The gripper 9 here is designed such that, in an unexpanded state, it can be passed through flow openings 25 in the insulating element, and the insulating element can be fixed in the gripper 9 by expansion of the expansion gripper as shown in cross section in FIG. 10d.

Figure 11:
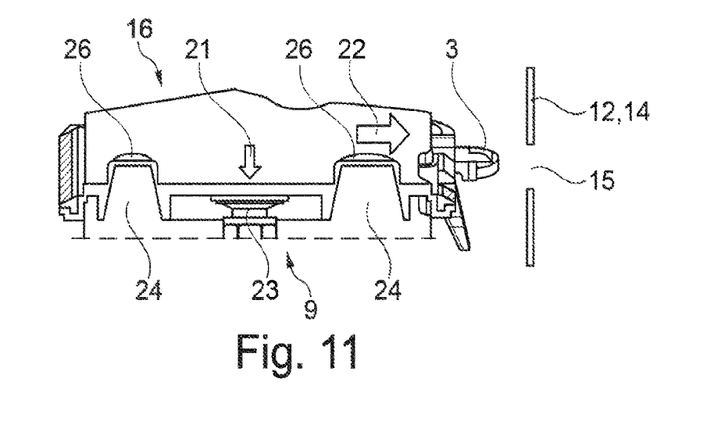
FIGS. 11 to 13 a schematic diagram of an illustrative coupling between robot gripper and the insulating element.

FIG. 11 shows, in illustrative and schematic form, the mounting of an insulating element 16 by the robot on a structural element 12, 14. The robot here pushes the insulating element 16 in the application direction 22 against the structural element 12, 14 such that the fixing element 3 is introduced into the opening 15 of the structural element 12, 14 and is mechanically locked therein. In this working example too, the gripping direction 21 and the application direction 22 form essentially an angle of 90° in the mounting of the insulating element 16 on the structural element 12, 14.

Figure 12:
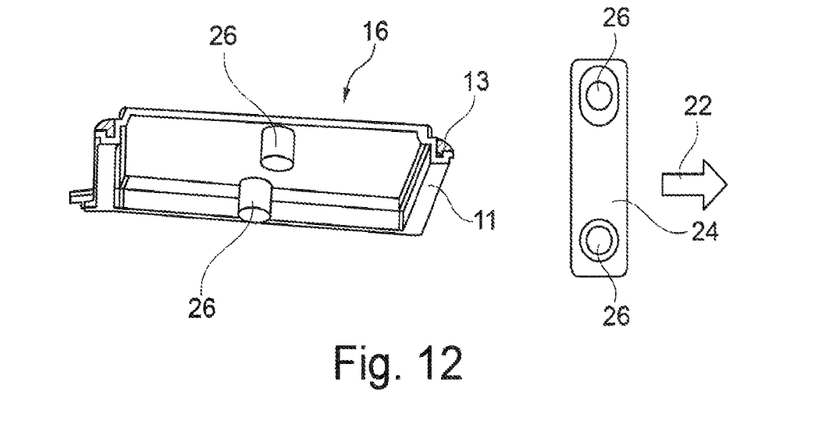

FIG. 12 shows, in schematic and illustrative form, engaging elements 26, 24. In this working example, the insulating element 16 has two cylindrical engaging elements 26, and the robot gripper has an engaging element 24 in the form of a plate with a round and an oval and an elongated opening for accommodation of the cylindrical engaging elements 26 of the insulating element 16.

Figure 13:
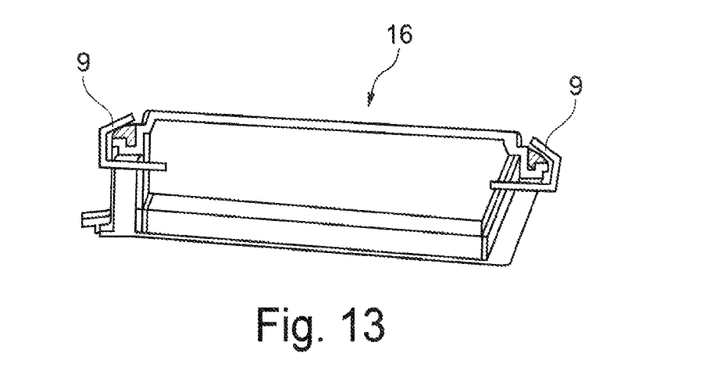

FIG. 13 shows, in schematic and illustrative form, a further variant of a gripper 9 of the robot. In this working example, the gripper 9 has at least two gripper elements that are movable in the manner of a clamp, and are able to grip the insulating element 16 at the edge thereof.

Figure 14:
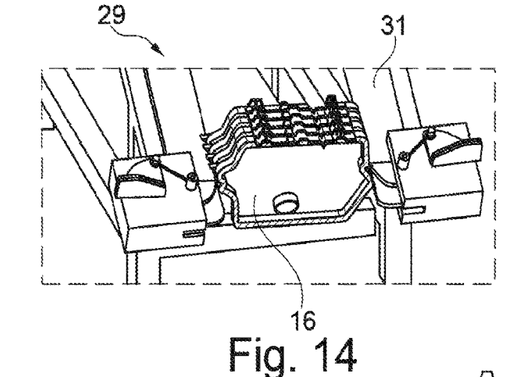
FIGS. 14 to 19 a schematic diagram of an illustrative intermediate station.

FIG. 14 shows a schematic of an illustrative frame 31. The insulating elements 16 in stacked form are arranged in said frame 31, and a foremost insulating element 16 is always kept ready in a predefined removal position.

Figures 15A, 15B:
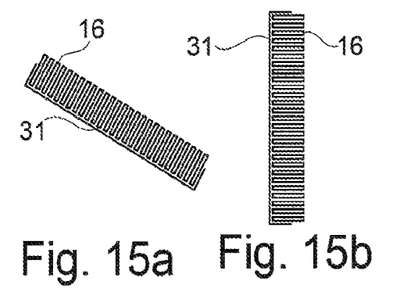

FIGS. 15*a* and 15*b* each depict an intermediate station in which the insulating elements 16 are disposed in a frame 31. In the working example of FIG. 15*a*, the frame 31 is inclined, and in the working example of FIG. 15*b*, the frame 31 is aligned vertically. For example, a position according to FIG. 15*a* may be used as a filling position of the frame 31, and a position according to FIG. 15*b* may be used as a use position of the frame 31.

Figure 16A:
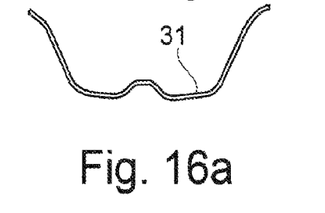
Figure 16B:
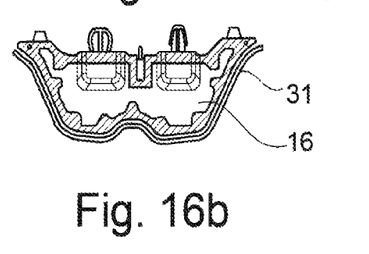
Figure 17A:
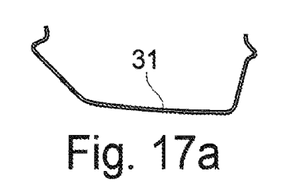
Figure 17B:
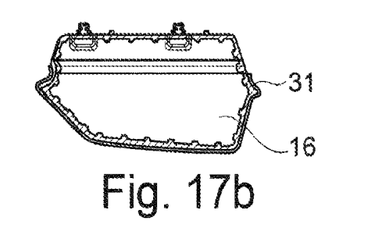
Figure 18A:
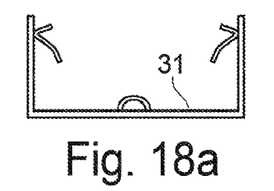
Figure 18B:
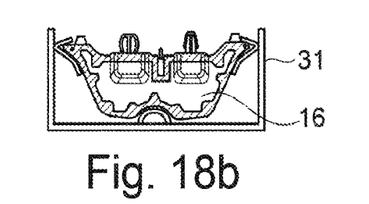
Figure 19A:
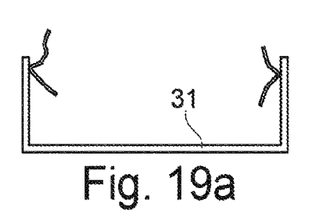
Figure 19B:
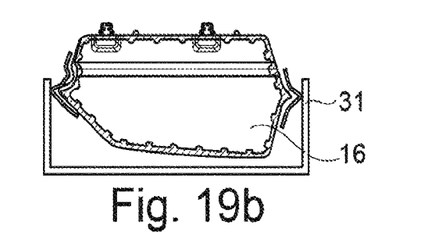

FIGS. 16*a* to 19*b* show various illustrative frames 31, each with and without insulating elements 16 disposed therein, in cross section. The frames 31 here are equipped with guide elements fitted to the outline of the insulating elements 16. In FIGS. 16 and 17, the guide elements follow roughly a lower half of the cross section of the insulating elements 16, and in FIGS. 18 and 19, the guide elements follow merely individual short sections of the cross section of the insulating elements 16.

LIST OF REFERENCE SIGNS

1 Stack
2 Base element
3 Fixing element
4 Spacer element
5 Step
6 Support element
7 Container
8 Robot
9 Gripper
10 Vehicle body
11 Carrier
12 Structural element
13 Expandable material
14 Structural element
15 Opening
16 Insulating element
17 Top side
18 Bottom side
19 Stacking direction
20 System
21 Gripping direction
22 Application direction
23 Suction gripper
24 Engaging element
25 Flow opening
26 Engaging element
27 Positioning element
28 Position recognition device
29 Intermediate station
30 Transfer element
31 Rack

The invention claimed is:

1. A system for mounting insulating elements on structural elements of motor vehicles, the system comprising:
a plurality of provided insulating elements, wherein each insulating element comprises a carrier and an expandable material arranged on the carrier, and wherein the insulating elements are configured for stacking with contact sites on top and bottom sides that allow adjacent insulating elements to lie against one another and be arranged parallel to one another when stacked;
a transfer element, an intermediate station, a robot, and at least one structural element;
wherein the transfer element is designed to arrange the provided insulating elements in the intermediate station;
wherein the insulating elements are arranged in a predefined spatial location and position in the intermediate station for removal by the robot; and
wherein the robot is designed to remove respective individual insulating elements from the intermediate station and to arrange them on structural elements.

2. The system as claimed in claim 1, wherein the insulating elements each comprise:
wherein the insulating element has a top side and a bottom side which, in a state of use, are substantially aligned in a plane of a cross section of the structural element that is to be sealed off.

3. The system as claimed in claim 1, wherein the plurality of provided insulating elements are in a stacked arrangement one on top of another in a container.

4. The system as claimed in claim 1, wherein the transfer element takes a form of a robot or of a cobot.

5. The system as claimed in claim 1, wherein the intermediate station comprises at least one base element, wherein the base element comprises positioning elements for positioning of the insulating element on the base element such that it is possible to arrange an insulating element or a stack on the base element in a predefined manner.

6. The system as claimed in claim 1, wherein the intermediate station comprises at least one conveyor system which is designed to convey the insulating elements or the stacks successively into a predefined removal position.

7. The system as claimed in claim 1, wherein the intermediate station comprises at least one frame which can accommodate a plurality of insulating elements, and which can provide the insulating elements in a predefined removal position.

8. The system as claimed in claim 7, wherein the frame has at least one guide element that at least partly follows an outline of an insulating element.

9. The system as claimed in claim 8, wherein the at least one guide element or a plurality of guide elements are designed such that the insulating elements can be taken up in only one spatial location.

10. The system as claimed in claim 1, wherein the robot comprises a multijoint robot arm and a gripper disposed thereon.

11. The system as claimed in claim 1, wherein the structural element takes a form of a single sheet, or of a plurality of sheets bonded to one another.

12. A method of mounting insulating elements on structural elements of motor vehicles, the method comprising the steps of:
providing multiple insulating elements, wherein each insulating element comprises a carrier and an expandable material arranged on the carrier, and wherein the insulating elements are provided in stacked form with contact sites that allow the insulating elements to be stacked one on top of another;
transferring the insulating elements to an intermediate station;
making the insulating elements available in a predefined spatial location and position in the intermediate station for removal by a robot;
removing individual insulating elements from the intermediate station by means of the robot; and mounting the insulating elements by means of the robot on a structural element.

13. The method as claimed in claim 12, wherein the provided insulating elements are in the form of stacks comprising a plurality of insulating elements stacked one on top of another, and wherein the transferring involves transporting these stacks.

14. The method as claimed in claim 12, wherein the insulating elements, in a mounting operation, are grasped by the robot in a gripping direction and mounted on the structural element in an application direction, wherein the gripping direction and the application direction form essentially an angle of 90° or of 180°.

15. The method as claimed in claim 12, wherein, in gripping of an insulating element by the robot, at least two engaging elements of the insulating element are fitted into at least two corresponding engaging elements of a gripper, wherein the at least two engaging elements of the insulating element are of different design.

\* \* \* \* \*